(12) United States Patent
Wang

(10) Patent No.: US 6,289,163 B1
(45) Date of Patent: Sep. 11, 2001

(54) FRAME-ACCURATE VIDEO CAPTURING SYSTEM AND METHOD

(75) Inventor: John Y. A. Wang, Mountain View, CA (US)

(73) Assignee: Agilent Technologies, Inc, Palo Alto, CA (US)

( * ) Notice: Subject to any disclaimer, the term of this patent is extended or adjusted under 35 U.S.C. 154(b) by 0 days.

(21) Appl. No.: 09/079,137

(22) Filed: May 14, 1998

(51) Int. Cl.[7] ............................................. H04N 5/76
(52) U.S. Cl. ............................. 386/46; 386/52; 386/64
(58) Field of Search .............................. 386/46, 52, 55, 386/68, 95, 104, 125, 64, 81

(56) References Cited

U.S. PATENT DOCUMENTS

| 4,685,003 | * | 8/1987 | Westland | 386/52 |
| 4,774,600 | * | 9/1988 | Baumeister | 386/55 |
| 5,122,886 | * | 6/1992 | Tanaka | 386/104 |
| 5,157,511 | * | 10/1992 | Kawai et al. | 386/68 |

FOREIGN PATENT DOCUMENTS

92/22983 * 12/1992 (WO) .......................... H04N/5/781

* cited by examiner

*Primary Examiner*—Huy Nguyen

(57) ABSTRACT

A frame-accurate video capturing system is described. The frame-accurate video capturing system captures a frame-accurate video segment into digital form. The system includes a start and stop frame capturing system that allows a user to identify a start frame and a stop frame of a desired video segment having a plurality of frames from an external video program. The frame-accurate video capturing system also includes a video segment capturing system that automatically captures the desired video segment of the external video program into digital form based on the start and stop frames captured by the frame capturing system. A method of accurately capturing a video segment from an external video program is also described.

2 Claims, 5 Drawing Sheets

US 6,289,163 B1

FRAME-ACCURATE VIDEO CAPTURING SYSTEM AND METHOD

BACKGROUND OF THE INVENTION

1. Field of the Invention

The present invention pertains to video processing. More particularly, this invention relates to a system and method for accurately capturing a video segment received from a conventional video player into digital form in a cost effective manner and without requiring time code information embedded into the video data.

2. Description of the Related Art

Many video images and/or programs are typically stored on conventional media such as magnetic tapes (also referred to as video tapes). These video images and programs can be referred to as video contents. Once stored on the conventional media, the video contents are typically accessed by conventional video playback devices, such as VCRs (Video Cassette Recorder) or video camcorders.

However, video contents stored on these conventional media are typically difficult to manage and manipulate. For example, in order for a user to locate a particular image frame in a video program stored on a magnetic tape, the user has to view the program linearly or sequentially. This means that the user has to view the program from the very beginning of the video program. Alternatively, the user may have to view the video tape that stores the video program and a number of other video programs until the desired image frame is identified. This is typically a very time consuming process. The process can also be very frustrating, especially when the desired image needs to be identified quickly from a large number of video tapes.

In order to reduce the time one needs to find the desired video image in a video program, timing information or time code can be embedded into the video program so that the user can direct the video player to the exact location of the desired video image immediately. In this case, the user inputs the time code into the video player such that the video player fast-forwards to the location of the desired video image. This approach, however, still bears the disadvantage that the user has to remember the time code of each desired image frame.

With the advance of computer technology, it is now possible to store video contents in a computer system digitally. The digitally converted images, video segments, or video programs that are stored in the computer can be quickly retrieved for display. The digital images can also be digitally altered. In addition, the digitally converted video contents allows greater flexibility and ease of manipulation and management.

Due to the storage limitations in a computer system, only a video frame, a video segment, or a number of a video frames or segments of a video program are converted into digital form and then stored in the computer system. This requires the converter that performs the digital video conversion function to have a video capturing function. A number of prior art video capturing systems have been proposed. However, disadvantages are associated with these prior art systems. For example, one type of such prior art video capturing system can only capture video continuously. This system cannot be stopped and restarted when performing the capturing function, which means a large video segment must be digitized, stored, and then edited later. Another type of such prior art video capturing system captures the video contents at relatively low resolution. A yet another type of such prior art video capturing system requires proprietary time code information to be embedded or recorded onto the media. In this case, special device interfaces are also required. The interfaces and time code information allow the computer to control and access specific image frames from the playback device.

Thus, there exists a need to accurately select and seamlessly capture video segments into digital form in a cost effective manner.

SUMMARY OF THE INVENTION

One feature of the present invention is to automatically and accurately capture and store high quality video segments into a computer system from a conventional video player.

Another feature of the present invention is to automatically and accurately capture and store high quality video segments into a computer system from a conventional video player in a cost effective manner.

A further feature of the present invention is to automatically and accurately capture a video segment from a video program without requiring timing information recorded with the video program.

A frame-accurate video capturing system is described. The frame-accurate video capturing system captures a frame-accurate video segment into digital form. The system includes a start and stop frame capturing system that allows a user to identify a start frame and a stop frame of a desired video segment having a plurality of frames from an external video program. The frame-accurate video capturing system also includes a video segment capturing system that automatically captures the desired video segment of the external video program into digital form based on the start and stop frames captured by the frame capturing system.

A method of accurately capturing a video segment from an external video program is also described. The method includes the step of capturing a first set of frames having a start frame of the video segment from the external video program and allowing the user to accurately select the start frame from the first set of frames. Then a second set of frames having a stop frame of the video segment is captured from the external video program. The method allows the user to accurately select the stop frame from the second set of frames. The start and stop frames are then stored in a frame register. The video segment is then automatically captured from the external video program using the captured start and stop frames. The captured video segment is in digital form.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
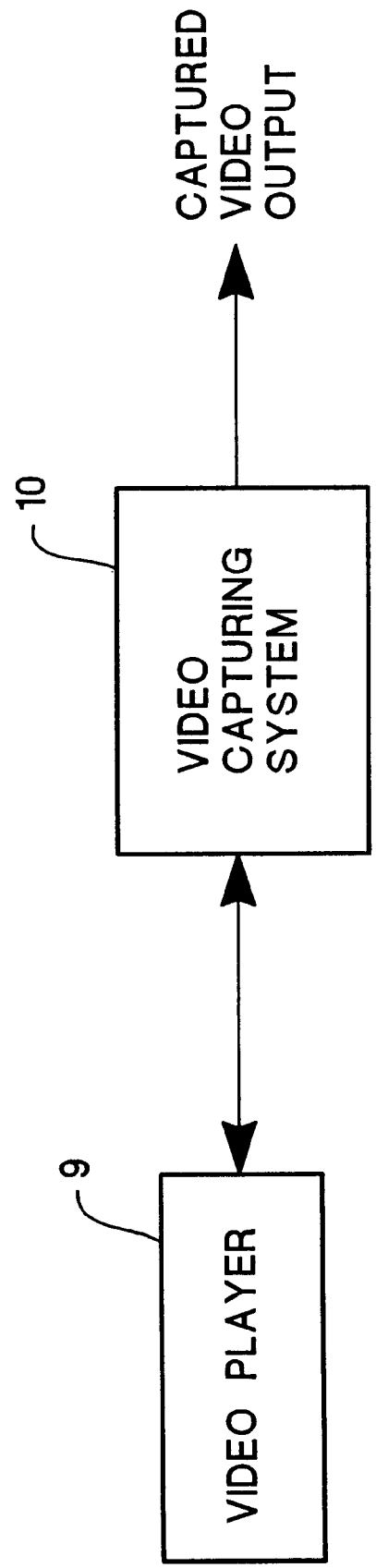
FIG. 1 shows a frame-accurate video capturing system for accurately capturing a video segment from an external video program provided by a conventional video player in accordance with the present invention.

FIG. 1 shows a frame-accurate video capturing system 10 that implements one embodiment of the present invention. As will be described in more detail below, the frame-accurate video capturing system 10 accurately captures a desired video segment from an external video program provided by an external conventional video player 9. The frame-accurate video capturing system 10 accurately captures the desired video segment in a cost effective manner. The frame-accurate video capturing system 10 also controls the video player 9 to play and replay the video program so that the system 10 can accurately capture the video segment.

Briefly, the frame-accurate video capturing system 10 includes a start and stop frame capturing system 11 and a video segment capturing system 12. The start and stop frame capturing system 11 allows the user of the frame-accurate video capturing system 10 to accurately identify and select the start frame and the stop frame of the desired video segment that the user hopes to capture from the external video program. The start and stop frame capturing system 11 includes a first-in-first-out (FIFO) frame buffer (i.e., the frame buffer 31 of FIG. 3) that captures the last N number of frames as they are being viewed by the user at a predetermined speed (e.g., the normal video playing speed) when the user notifies the frame-accurate video capturing system 10 that the user has identified the desired start or stop frame. N indicates the size of the frame buffer and is a predetermined or pre-specified number. N should be large enough such that the captured last N frames include the desired start or stop frame. The start and stop frame capturing system 11 then allows the user to view the captured last N frames stored in the frame buffer in a frame-by-frame fashion to accurately identify the start or stop frame. The start and stop frame capturing system 11 also stops the video player 9.

The video segment capturing system 12 is then used to automatically capture the desired video segment into digital form based on the start and stop frames captured by the start and stop frame capturing system 11. The frame-accurate video capturing system 10 will be described in more detail below, also in conjunction with FIGS. 1–5.

Referring again to FIG. 1, the video player 9 can be any known video playing device. For example, the video player 9 can be a VCR player, a video tape recorder (VTR) player, a camcorder, a video disc player. The video player 9 is equipped with a number of conventional functions, such as play, rewind, fast forward, stop, pause, etc. When the video player 9 plays a video program, it generates video data of the video program. The video player 9 can be remotely controlled in a wireless fashion or via wires.

As can be seen from FIG. 1, the video capturing system 10 is connected to the video player 9 to receive the video data of the video program supplied by the video player 9. The connection between the video player 9 and the video capturing system 10 may be direct wire connection or via another means (e.g., via a network). The video capturing system 10 also controls the video player 9 to play and supply the video program to the video capturing system 10. This means that the video capturing system 10 controls the video player 9 to perform all of its playing functions (e.g., play, rewind, fast forward, stop, etc.) with respect to the video program. As described above, this control of the video player 9 can be wireless or via wires from the video capturing system 10.

The video data received from the video capturing system 10 can be compressed video data (e.g., MPEG or JPEG data), or uncompressed or decompressed video data in digital or analog format. MPEG stands for Moving Picture Experts Group and JPEG stands for Joint Photographic Experts Group.

The video capturing system 10 can be implemented by hardware, software, firmware, or a combination thereof. In addition, the video capturing system 10 can be implemented in a computer system, using the resources of the computer system and some interface circuits to control the video player 9. The computer system can be a personal computer, a workstation computer, a mainframe computer, a network computer, a server computer, a supercomputer, a notebook computer, a mini-computer, or any other type of data processing system.

Figure 2:
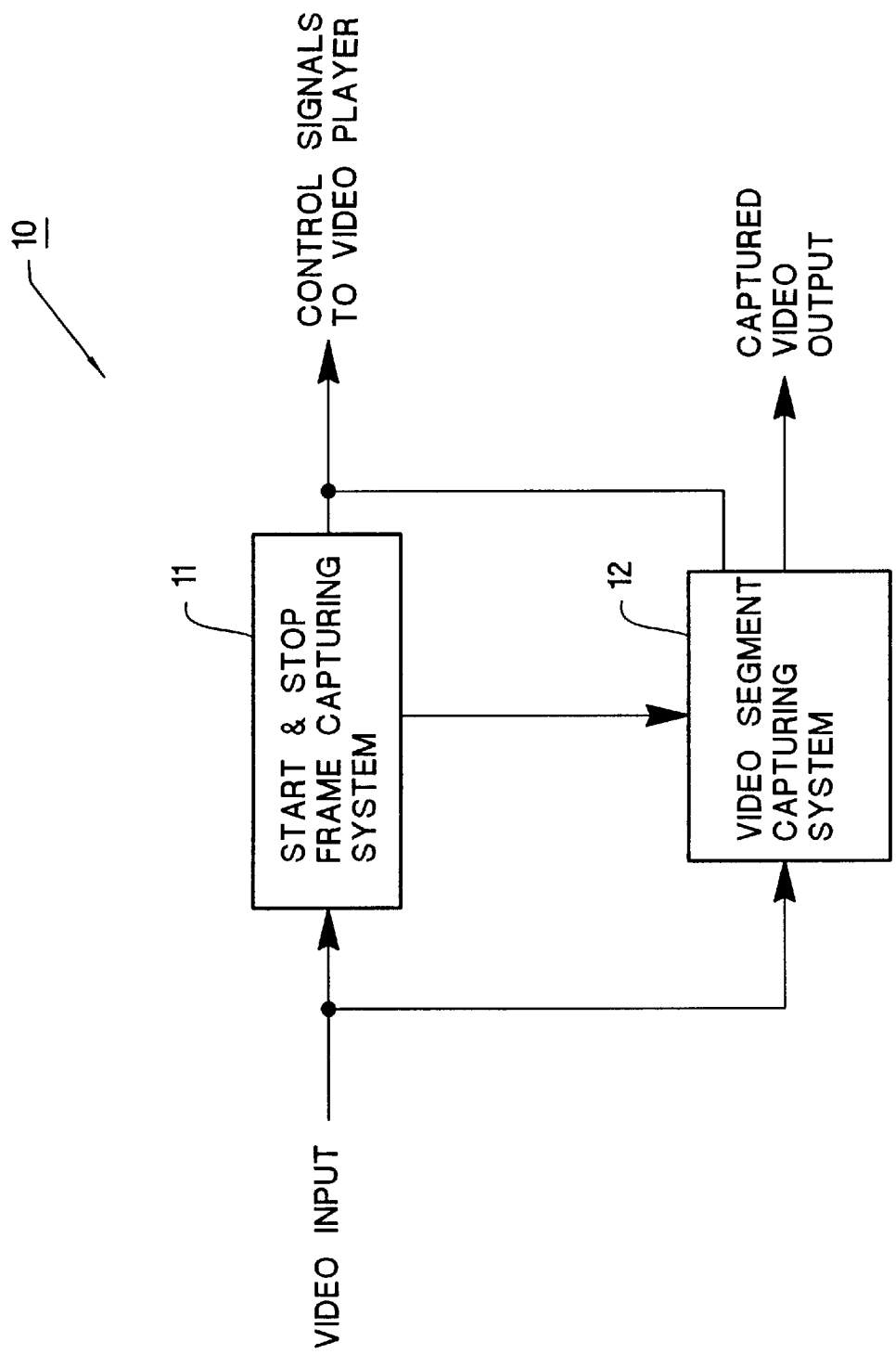
FIG. 2 shows the structure of the frame-accurate video capturing system of FIG. 1, wherein the frame-accurate video capturing system includes a start and stop frame capturing system and a video segment capturing system.

As described above, the video capturing system 10 is a frame-accurate video capturing system. This means that the video capturing system 10 accurately captures a desired video segment from the video program played by the video player 9. The frame-accurate video capturing system 10 accurately captures the desired video segment in a cost effective manner. This is done by first capturing a number of video frames so that the user can accurately select the start or stop frame of the desired video segment to be captured by the system 10. Based on the captured start and stop frames, the frame-accurate video capturing system 10 then automatically captures the desired video segment. The frame-accurate video capturing system 10 also controls the video player 9 to play and replay the video program so that the system 10 can accurately capture the start and stop frames as well as the desired video segment specified by the start and stop frames. FIG. 2 shows the structure of the video capturing system 10 in accordance with one embodiment of the present invention.

As can be seen from FIG. 2, the frame-accurate video capturing system 10 includes a start and stop frame capturing system 11. The start and stop frame capturing system 11 allows the user to accurately capture the start and stop frames of each desired video segment. The start and stop frame capturing system 11 allows the capture of the start and stop frames of a number of desired video segments. The start and stop frame capturing system 11 also stores those captured start and stop frames. After the start and stop frames are stored in the start and stop frame capturing system 11, these frames can be used by the video segment capturing system 12 to capture the desired video segment automatically.

As described above, the main function of the start and stop frame capturing system 11 is to allow the user to accurately select the start and stop frames of a desired video segment. This means that the user can select the exact start and stop frames of the desired video segment using the start and stop frame capturing system 11 as the video program is being played by the video player 9. To accomplish this, the start and stop frame capturing system 11 employs a frame buffer (i.e., the frame buffer 31 shown in FIG. 3) that always stores the last played N frames received from the video player 9. The user can then individually view these frames to select the start or stop frame.

N is a predetermined number. In one embodiment, N is selected such that the last one to five seconds of video frames can be stored in the frame buffer of the start and stop frame capturing system 11. Alternatively, N can be more than five seconds of video frames (i.e., >24×5) or fewer than one second of video frames (i.e., <24).

Figure 3:
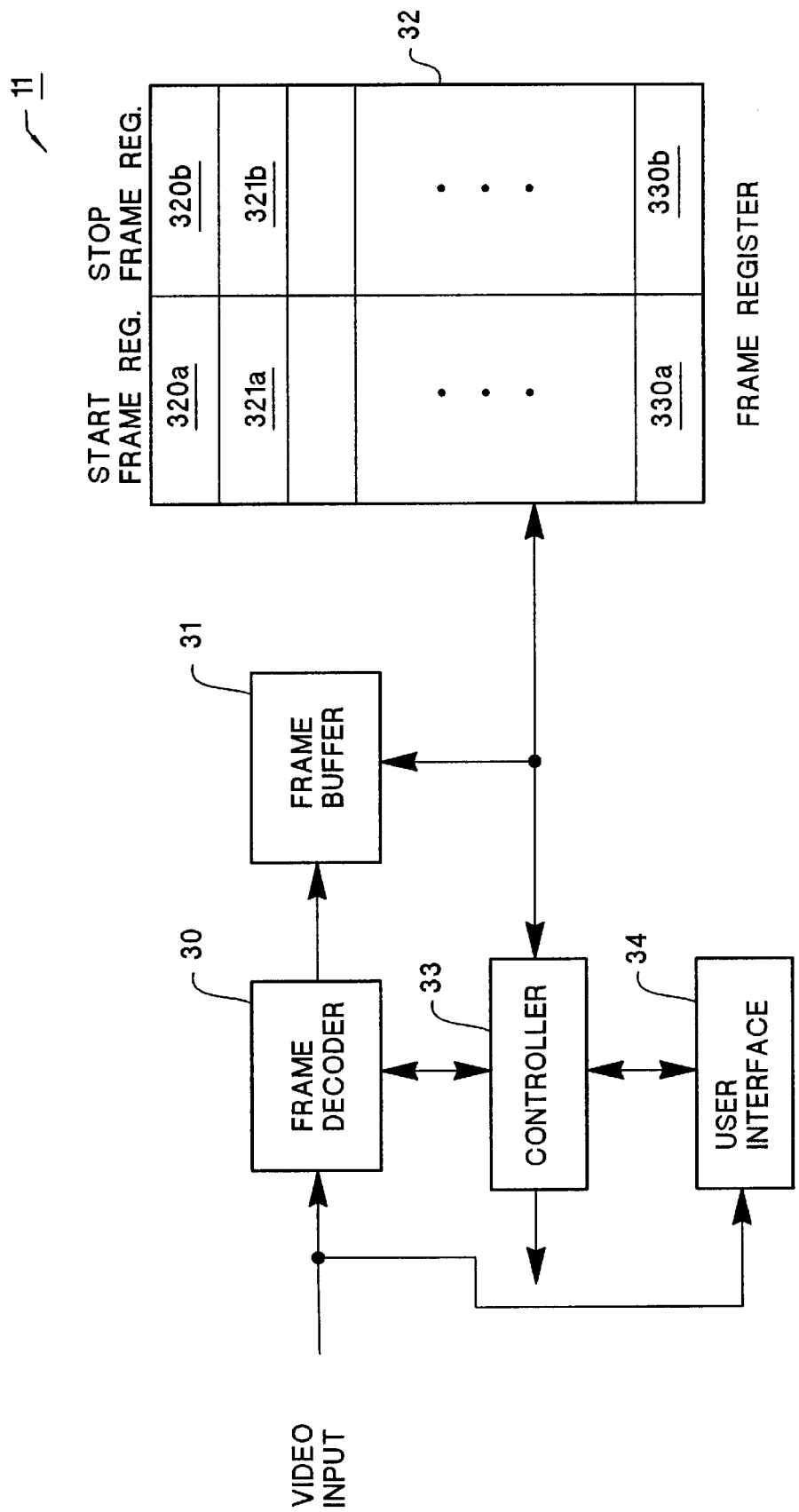
FIG. 3 shows the structure of the start and stop frame capturing system of FIG. 2.

During operation, the user causes the start and stop frame capturing system 11 to control the video player 9 of FIG. 1 to play the video program that contains the desired video segment in order to identify the start and stop frames of the desired video segment. The frame buffer of the start and stop frame capturing system 11 continuously receives up to N frames of digitized video data in a first-in-first-out manner. Thus, the start and stop frame capturing system 11 always stores N frames that are last received. When the user sees the desired start or stop frame, the user causes the start and stop frame capturing system 11 to stop the video player 9. This may cause some latency in stopping the video player 9 and therefore, the desired start or stop frame may not be the last captured frame in the frame buffer of the start and stop frame capturing system 11. The start and stop frame capturing system 11 then causes each of the N frames stored in the frame buffer to be individually viewed by the user to determine the start or stop frame. Once the start or stop frame is determined, the start and stop frame capturing system 11 then stores the selected start or stop frame and moves on to either capture the stop frame or to activate the video segment capturing system 12. FIG. 3 shows the structure of the start and stop frame capturing system 11, which will be described in more detail below.

As can be seen from FIG. 3, the start and stop frame capturing system 11 includes a frame decoder 30. The frame decoder 30 is coupled to receive the video data from the video player 9 (Figure I) to detect the video data for each video frame from the received video data. Depending on the video data received, the frame decoder 30 includes an A/D converter or a digital signal decoder. If the input video data is in analog form, the frame decoder 30 includes an A/D converter that converts the analog video data of each frame into digital form. If the input video data is in digital form, the frame decoder 30 includes a digital signal decoder. The frame decoder 30 can be implemented by any known technology, and therefore is not described in more detail below.

The start and stop frame capturing system 11 also includes a frame buffer 31 coupled to the frame decoder 30. The frame buffer 31 stores the digitized video data for each of N frames last received from the frame decoder 30. The frame buffer 31 is a first-in-first-out (FIFO) buffer and N is a predetermined number, as described above. N also determines the size of the frame buffer 31. The frame buffer 31 can be implemented by any known storage device.

Both the frame decoder 30 and the frame buffer 31 are controlled by a controller 33. The controller 33 also controls the video player 9 of FIG. 1 using conventional video player control means. For example, the known wireless remote control technology can be employed in the controller 33 to control the video player 9.

Figure 5:
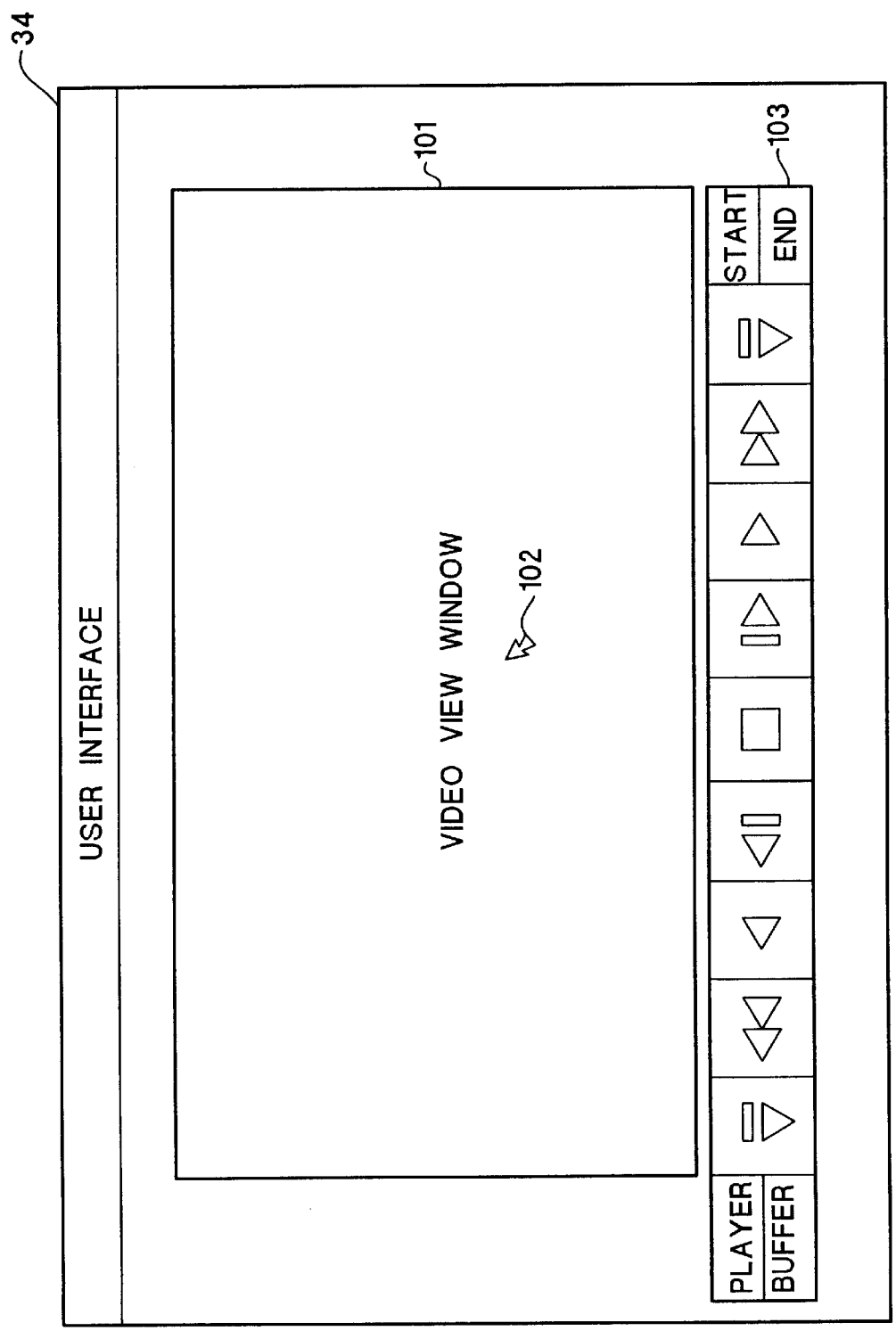
FIG. 5 shows the user interface of FIG. 3.

The controller 33 is controlled by the user through a user interface 34 of the start and stop frame capturing system 11. The user interface 34 is displayed on a display device (not shown). The display device that displays the user interface 34 can be a computer display. The user interface 34 is an interactive interface that allows the user to control the controller 33. The user interface 34 can be implemented by any known user interface technology. FIG. 5 shows the structure of the user interface 34, which will be described in more detail below.

Referring to FIG. 5, the user interface 34 includes a video view window 101 that displays video frames received from the video player 9 (FIG. 1) or the frame buffer 31 (FIG. 3). The user interface 34 also includes a cursor 102 controlled by a cursor control device (e.g., a mouse). The user interface 34 also includes a number of video viewing buttons 103. These buttons 103 can be activated by the user through a cursor control device in known manner. The buttons 103 include the video player or frame buffer selection buttons that control video display from either the video player 9 or the frame buffer 31. The buttons 103 also include a number of video viewing functions such as fast-reverse play, reverse play, reverse frame play, stop, frame play, play, fast-forward play, start from the beginning (i.e., start) and start from the end (i.e., end).

Referring back to FIG. 3, the output of the frame buffer 31 is supplied to a frame register 32 that includes a number of register pairs. Each pair of registers within the frame register 32 stores a start frame and a stop frame of a desired video segment. For example, the registers 320a and 320b form one register pair within frame register 32 and the register 320a stores one start frame and the register 320b stores one stop frame. The frame register 32 includes a number of register pairs such that a number of start and stop frame pairs can be stored in the frame register 32.

During operation, the controller 33 controls the operation of the frame decoder 30. The controller 33 also controls the frame decoder 30 to send each of the digital video frames to the frame buffer 31 in the FIFO manner. When the user sees the desired start or stop frame via the user interface 34, the user controls controller 33 via the user interface 34 to stop the video player 9 (FIG. 1). At this time, the frame buffer 31 stores the last N frames received from the video player 9 which includes the desired start or stop frame. The user then controls the controller 33 via the user interface 34 to retrieve each of the stored N frames from the frame buffer 31 and to display the frames on the user interface 34 so that the user can select the desired start or stop frame. Once the desired start or stop frame is selected by the user via the controller 33, the controller 33 controls the frame buffer 31 to store the selected start or stop frame to the appropriate register in the frame register 32. For example, if the registers 320a and 320b are empty and can store one pair of start and stop frames and the selected frame is a start frame, the controller 33 controls the frame buffer 31 to store the selected start frame in the register 320a. The controller 33 then controls the video player 9 and the components 30–32 to capture the stop frame in the same manner as described above.

Referring to back to FIG. 2, once the start and stop frame capturing system 11 captures the start and stop frames of the desired video segment, the video segment capturing system 12 can then automatically capture the desired video segment that is specified by the captured start and stop frames. To do this, the video segment capturing system 12 receives the start and stop frames from the start and stop frame capturing system 11. In addition, the video segment capturing system 12 also controls the video player 9 to rewind or move the video program that contains the desired video segment to its beginning position. The video segment capturing system 12 then controls the video player 9 to play the video program. The video segment capturing system 12 then compares each video frame received first with the start frame of the desired video segment to see if there is a match. If so, the video segment capturing system 12 then stores every digitized video frame starting from the start frame. Meanwhile, the video segment capturing system 12 compares each video frame received with the stop frame of the desired video segment to see if there is a match. If so, the video segment capturing system 12 then stops storing the received video frames and the capturing process of the desired video segment specified by the start and stop frames is now completed. The structure of the video segment capturing system 12 is shown in FIG. 4, which will be described in more detail below.

Figure 4:
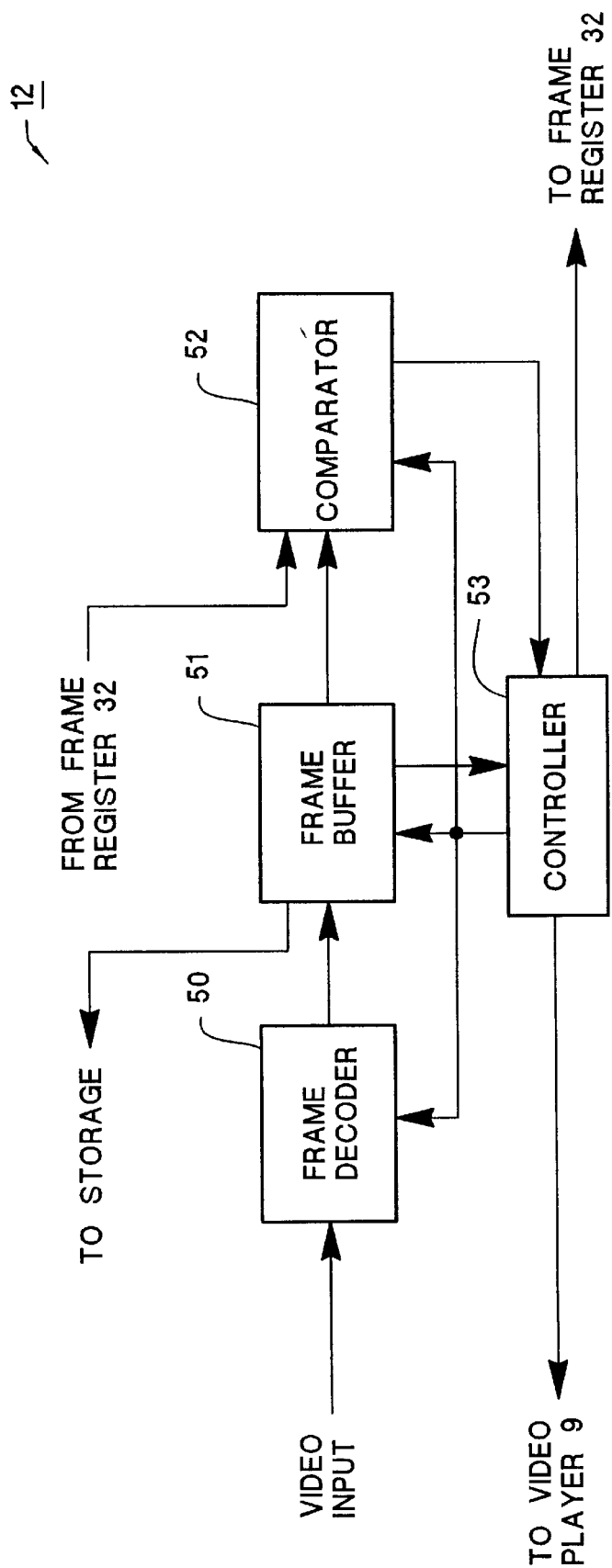
FIG. 4 shows the structure of the video segment capturing system of FIG. 2.

In FIG. 4, the video segment capturing system 12 includes a frame decoder 50 coupled to receive the video data from the video player 9 of FIG. 1. The function of the frame decoder 50 is similar to that of the frame decoder 30 of the start and stop frame capturing system 11. Thus, the two frame decoder can be implemented by a single physical frame decoder circuit. The frame decoder 50 is controlled by a controller 53.

The output of the frame decoder 50 is applied to a frame buffer 51. The frame buffer 51 is used to store the digitized video frames. Like the frame buffer 31 of FIG. 3, the frame buffer 51 is a FIFO buffer with a predetermined storage size. The frame buffer 51 is also controlled by the controller 53. The frame buffer 51 notifies the controller 53 if it is full.

The output of the frame buffer 51 is coupled to a comparator 52. The function of the comparator 52 is to compare the frame received in the frame buffer 51 with the start or stop frame received from the start and stop frame capturing system 11. The comparator 52 can be implemented by any known image comparator. The output of the frame buffer 51 is also connected to an external storage (not shown) such that the buffered flames in the frame buffer 51 can be stored.

During operation, the controller 53 first causes the comparator 52 to receive a start and a stop frame of a desired video segment from the frame register 32 of the start and stop frame capturing system 11. The controller 53 then controls the video player 9 to start playing the video program that contains the desired video segment specified by the start and stop frames. The controller 53 also controls the frame decoder 50 to convert each of the received frames into digital form. The digitized frames are then stored in the frame buffer 51 in the FIFO manner. Each of the frames stored in the frame buffer 51 is also sent to the comparator 52 to compare with the start frame. When there is a match. The controller 53 controls the frame buffer 51 to retain all the frames starting from the start frame. If the frame buffer 51 is full, the controller 53 stops the video player 9 so the frames stored in the frame buffer 51 can be sent to the external storage. Then the controller 53 controls the video player 9 to continue playing the video program.

Meanwhile, each of the frames received in the frame buffer 51 is sent to the comparator 52 to compare with the stop frame. If there is a match, the controller 53 is notified and the controller controls the video player 9 to stop playing the video program because the desired video segment has been captured. The controller 53 also controls the frame buffer 51 to send all the frames in the frame buffer 51 prior to the stop frame to the external storage.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A frame-accurate video capturing system, comprising:

(A) a start and stop frame capturing system that (1) allows a user to accurately select a start frame and a stop frame of a desired video segment having a plurality of frames from an external video program, and (2) stores the selected start and stop frames of the desired video segments; and (B) a video segment capturing system that automatically captures the desired video segment of the external video program into digital form based on the selected start and stop frames, said video segment capturing system including an image comparator that is configured to compare frames of the external video program with the selected start and stop frames to automatically capture the desired video segment of the external video program.

2. A method of accurately capturing a video segment from an external video program, comprising the steps of:

(A) capturing a first set of frames having a start frame of the video segment from the external video program in accordance with a user command and allowing the user to accurately select the start frame from the first set of frames;

(B) capturing a second set of frames having a stop frame of the video segment from the external video program in accordance with a user command and allowing the user to accurately select the stop frame from the second set of frames;

(C) automatically capturing the video segment from the external video program using the captured start and stop frames without user intervention, including comparing frames of the external video program with the captured start and stop frames to capture the video segment, wherein the captured video segment is in digital form.

* * * * *